(12) United States Patent
Watanabe (10) Patent No.: US 11,770,615 B2
(45) Date of Patent: Sep. 26, 2023

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Tatsuya Watanabe, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 108 days.

(21) Appl. No.: 17/317,662

(22) Filed: May 11, 2021

(65) Prior Publication Data
US 2021/0360160 A1 Nov. 18, 2021

(30) Foreign Application Priority Data
May 15, 2020 (JP) ................................. 2020-086045

(51) Int. Cl.
*H04N 23/68* (2023.01)
*H04N 23/695* (2023.01)

(52) U.S. Cl.
CPC ......... *H04N 23/687* (2023.01); *H04N 23/682* (2023.01); *H04N 23/683* (2023.01); *H04N 23/6812* (2023.01); *H04N 23/695* (2023.01)

(58) Field of Classification Search
None
See application file for complete search history.

(56) References Cited

U.S. PATENT DOCUMENTS 5,978,600 A * 11/1999 Takeuchi ............. G02B 27/646
396/53
2017/0223259 A1* 8/2017 Ito ..................... H04N 5/232122

FOREIGN PATENT DOCUMENTS

JP H11187308 A 7/1999

* cited by examiner

*Primary Examiner* — Cynthia Segura
(74) *Attorney, Agent, or Firm* — CANON U.S.A., INC. IP Division (57) ABSTRACT

An apparatus comprising, a capturing unit, a rotation unit for adjusting an image capturing direction by rotating the capturing unit, a control unit for controlling a rotational position of the rotation unit, a first detection unit for detecting a first shake of the apparatus, and a storage unit for storing a rotational position of the rotation unit in association with an anti-vibration setting, wherein the control unit determines the rotational position, based on a designated image capturing direction, and controls an operation of the rotation unit to cancel the detected first shake, during image capture at the determined rotational position, based on the stored anti-vibration setting.

19 Claims, 7 Drawing Sheets

APPARATUS, METHOD, AND NON-TRANSITORY COMPUTER-READABLE STORAGE MEDIUM

BACKGROUND OF THE DISCLOSURE

Field of the Disclosure

The aspect of the embodiments relates to an apparatus, a method, and a non-transitory computer-readable storage medium.

Description of the Related Art

In the related art, there is known technology including acquiring a shake of an image capturing apparatus from a sensor and detecting a shake vector of a subject from a captured image and thus sensing a pan/tilt operation of the image capturing apparatus and accordingly changing a correction value of anti-vibration (refer to Japanese Patent Laid-Open No. 11-187308).

SUMMARY OF THE DISCLOSURE

One aspect of exemplary embodiments relates to an apparatus comprising, a capturing unit, a rotation unit configured to adjust an image capturing direction by rotating the capturing unit, a control unit configured to control a rotational position of the rotation unit, a first detection unit configured to detect a first shake of the apparatus, and, a storage unit configured to store a rotational position of the rotation unit in association with an anti-vibration setting, wherein the control unit determines a rotational position of the rotation unit, based on a designated image capturing direction by the capturing unit, and controls an operation of the rotation unit to cancel the detected first shake, during image capture by the capturing unit at the determined rotational position, based on the anti-vibration setting stored in the storage unit in association with the determined rotational position.

Further features of the disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Figure 1A:
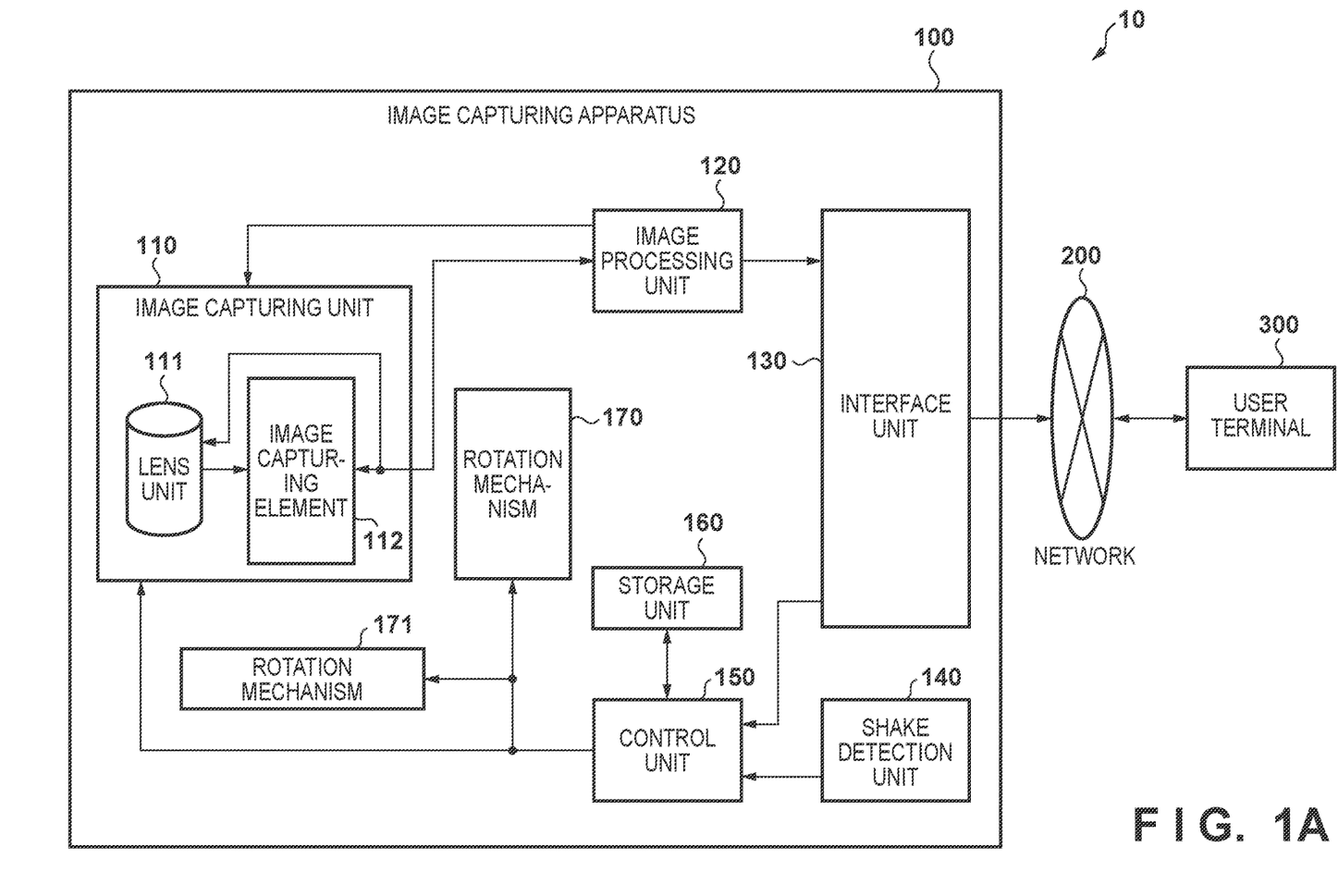
FIG. 1A is a figure illustrating an example of a system configuration corresponding to a first embodiment.

A first embodiment will be described below by referring to the drawings. First, a system configuration corresponding to the embodiment will be described by referring to FIG. 1A. FIG. 1A is a figure illustrating a configuration example of a system corresponding to the embodiment. A system 10 corresponding to the present embodiment includes an image capturing apparatus 100 connected to a user terminal 300 via a network 200.

In the present embodiment, anti-vibration control in a case where ON/OFF information of anti-vibration set by a user in the user terminal 300 is stored in association with position information of a rotation mechanism of the image capturing apparatus 100, and anti-vibration is performed by controlling the rotation mechanism will be described. Anti-vibration processing of the present embodiment is effective in a case where the image capturing apparatus 100 is installed in an environment, for instance, a vessel or a bridge in which the image capturing apparatus 100 shakes (or can also be referred to as "vibrate" or "oscillate," but "shake" will collectively be used below) at a low frequency.

The image capturing apparatus 100 includes an image capturing unit 110 including a lens unit 111 and an image capturing element 112, an image processing unit 120, an interface unit 130, a shake detection unit 140, a control unit 150, a storage unit 160, and rotation mechanisms 170 and 171.

The image capturing unit 110 includes the lens unit 111 and the image capturing element 112. An image capturing direction of the image capturing unit 110 is changed and fixed by the rotation mechanisms 170 and 171 described below. In the present embodiment, although the image capturing unit 110 is described under a condition where the image capturing unit 110 contains the lens unit 111 and the image capturing element 112, the image capturing unit 110 may contain the image processing unit 120 and the interface unit 130.

An image of a scene captured by the image capturing apparatus 100 is formed on the image capturing element 112 through the lens unit 111. The lens unit 111 can include an optical lens, an optical filter, a diaphragm mechanism, and a drive system or the like for driving each of the optical lens, the optical filter, and the diaphragm mechanism. The optical filter may include, for instance, a visible light cut filter, an infrared ray cut filter, a neutral density (ND) filter, or the like. The drive system acquires a setting value from the image processing unit 120 and the control unit 150, and switches the optical lens and the optical filter in accordance with an acquired setting value.

The image capturing element 112 is, for instance, an image sensor of a CMOS or a CCD, and outputs an analog signal according to light with which an image is formed by the lens unit 111. The analog signal is converted into a digital signal by an A/D conversion circuit (not illustrated) and is output to the image processing unit 120 as an image signal.

The image processing unit 120 performs predetermined image processing, for instance, developing processing, filtering processing, sensor correction, noise removal, or the like on an image signal received from the image capturing element 112. In a case where exposure control is performed, a setting value is transmitted to the lens unit 111 and the image capturing element 112 and adjustment is performed to enable acquisition of an appropriate exposure image. Assuming that the exposure control is performed by known technology, details of the exposure control will be omitted. An image generated by the image processing unit 120 is sent to the interface unit 130.

The interface unit 130 communicates with the user terminal 300 via the network 200 described below. An image received from the image processing unit 120 is transmitted to the user terminal 300 via the network 200. In addition, information of an anti-vibration setting of the image capturing apparatus 100 received from the user terminal 300 (referred to as "anti-vibration setting information," below) is provided to the control unit 150.

The shake detection unit 140 acquires shake information of the image capturing apparatus 100. The shake detection unit 140 includes a sensor, for instance, a gyroscope sensor or an acceleration sensor that detects a direction and an amount of a shake of the image capturing apparatus 100, and a sensor according to an installation environment of the image capturing apparatus 100 is selected. In the present embodiment, the case where the image capturing apparatus 100 is installed in an environment, for instance, a vessel or a bridge in which the image capturing apparatus 100 shakes at a low frequency is assumed, and thus a sensor suitable for acquiring the shake may be desirable. The shake detection unit 140 sends a value acquired by the sensor to the control unit 150 as the shake information.

The control unit 150 controls various operations of the image capturing apparatus 100. In addition, the control unit 150 executes control of rotational positions of the rotation mechanisms 170 and 171 in two control modes. A first mode that is a first control mode is a mode in which the rotational positions of the rotation mechanisms 170 and 171 are controlled based on information of an image capturing area designated by a user and received via the interface unit 130, and the first mode is used in the case of designating or changing an area intended for image capture by the image capturing apparatus 100. A second mode that is a second control mode is a mode in which anti-vibration is performed by controlling the rotational positions of the rotation mechanisms 170 and 171 and operating to cancel a shake, based on the shake information of the image capturing apparatus 100 acquired from the shake detection unit 140.

In a case where the anti-vibration setting information is sent from a user, it is determined based on the information whether or not to perform the anti-vibration control, and in a case where the anti-vibration setting information is not sent from a user, it is determined based on an anti-vibration setting stored in the storage unit 160 described below whether or not to perform the anti-vibration control. Further, in a case where the control unit 150 receives the anti-vibration setting information set by a user, the control unit 150 sends the anti-vibration setting information to the storage unit 160 together with the rotational positions of the rotation mechanisms 170 and 171.

The storage unit 160 saves the rotational positions in association with the anti-vibration setting information received from the control unit 150. The anti-vibration setting information with respect to each of the rotational positions is uniquely determined, and in a case where the anti-vibration setting information is acquired again from the control unit 150, new setting information is stored.

The rotation mechanisms 170 and 171 each include a pan/tilt mechanism that holds the image capturing unit 110 and that directs the image capturing unit 110 in a direction in which a user intends to perform image capture. Each of the rotation mechanisms 170 and 171 corresponds to pan control and tilt control, and includes a motor for drive, for instance, an ultrasonic motor or a stepping motor, and drives orientation of the image capturing apparatus 100 to the rotational position received from the control unit 150. In addition, the pan/tilt mechanism also operates to cancel a shake of the image capturing apparatus 100 in the second mode described above.

The network 200 includes, for instance, a plurality of routers, switches, cable, or the like that satisfy a communication standard such as Ethernet. In the present embodiment, as long as the network 200 enables communication between the interface unit 130 and the user terminal 300, a communication standard, a scale and a configuration of the network 200 are not limited. For instance, the network 200 may include the Internet, a wired local area network (LAN), a wireless LAN, a wide area network (WAN) or the like. Similarly, the interface unit 130 and the user terminal 300 also include a transmission and reception function that satisfies the contents described above.

The user terminal 300 includes a personal computer (PC, below), a smartphone, a tablet terminal, or the like. As described taking a PC as an example, an image received via the network 200 is displayed to a user on a display. The user confirms the image displayed on the display, and inputs an anti-vibration ON/OFF setting, designation of the image capturing area or the like from a user interface of the PC. Setting information input to the user terminal 300 is sent to the interface unit 130 via the network 200.

Figure 1B:
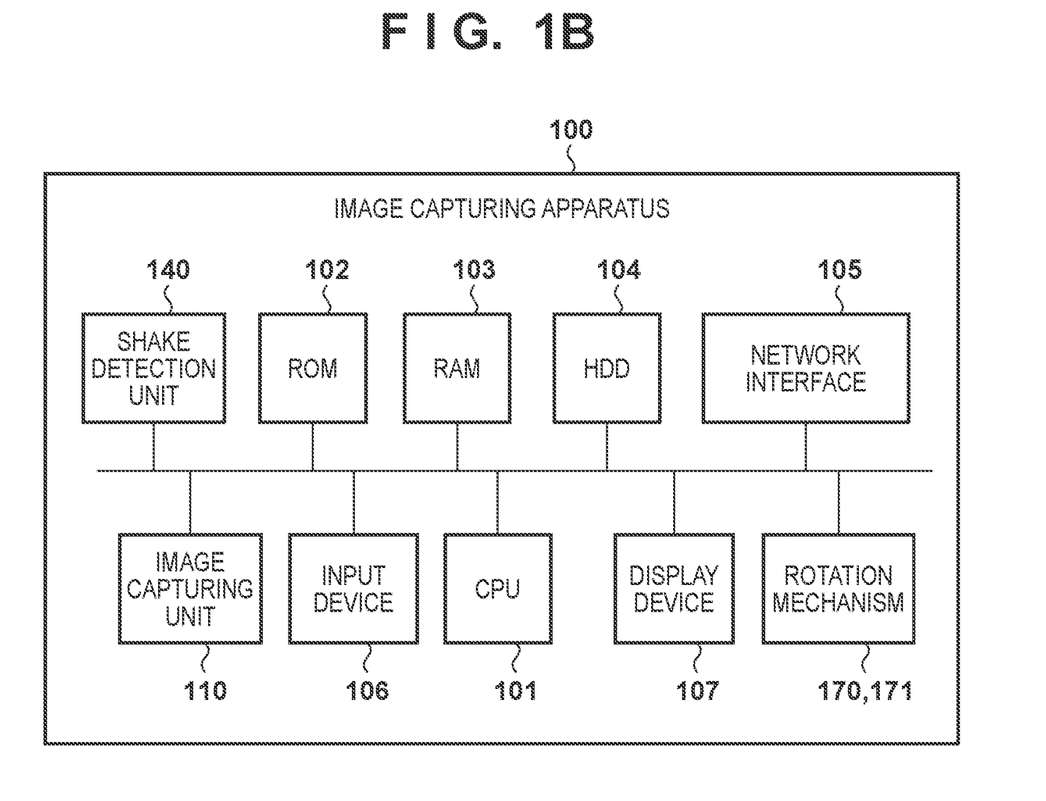
FIG. 1B is a figure illustrating an example of a hardware configuration of an image capturing apparatus 100.

Next, FIG. 1B is a figure illustrating an example of a hardware configuration of the image capturing apparatus 100 corresponding to the embodiment. The image capturing apparatus 100 includes a CPU 101, a ROM 102, a RAM 103, a hard disk drive (HDD) 104, a network interface 105, an input device 106, and a display device 107. In addition, the image capturing apparatus 100 further includes the image capturing unit 110, the shake detection unit 140, and the rotation mechanisms 170 and 171. The network interface 105 is connected to the network 200. The CPU 101 is a control device that integrally controls the image capturing apparatus 100, and can function as the image processing unit 120 and the control unit 150. The ROM 102 stores a program for the CPU 101 to control the image capturing apparatus 100. Note that a secondary storage device may be provided in place of the ROM 102.

The RAM 103 is a memory for the CPU 101 to expand a program read out from the ROM 102 and to execute processing. In addition, the RAM 103 is a temporary storage memory and is also used as a storage area for temporarily storing data to be subjected to various kinds of processing. The RAM 103 can operate as the storage unit 160 of FIG. 1A. The HDD 104 may store a captured image. The network interface 105 is a circuit that performs communication via the network 200, and can function as the interface unit 130. The CPU 101 acquires an anti-vibration setting or the like from the user terminal 300 via the network 200. The display device 107 is a device such as a display that displays an image and an area frame. The input device 106 includes a pointing device, a touch panel, a button, a switch, or the like for instructing a display position in a display area of the display device 107.

Figure 2:
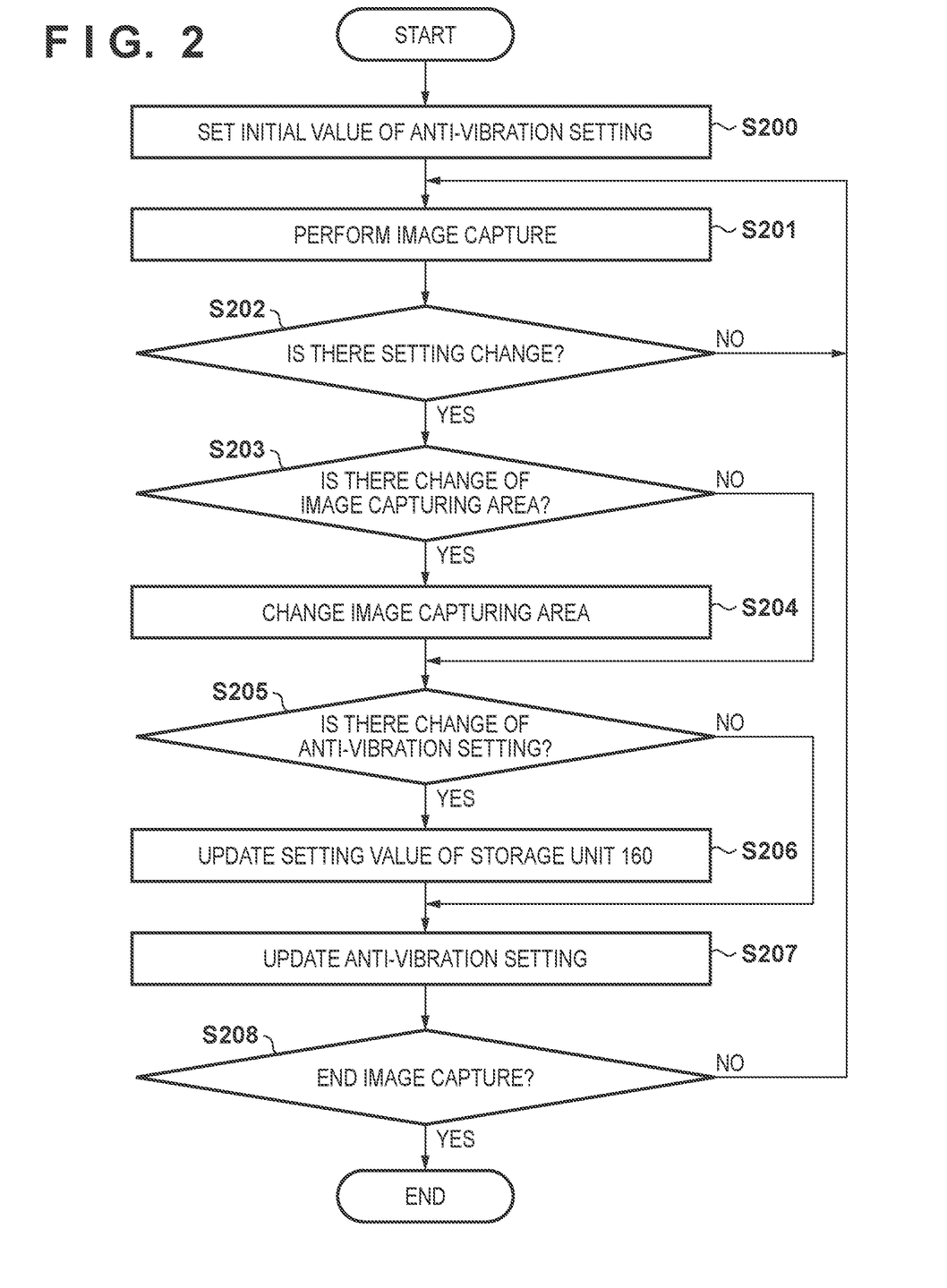
FIG. 2 is a flowchart illustrating an example of processing corresponding to the first embodiment.

Next, a flow of processing of the anti-vibration control in the present embodiment will be described by referring to FIG. 2. The anti-vibration control may be started, for instance, at the time of starting image capture by the image capturing apparatus 100. The processing corresponding to FIG. 2 can be realized by, for instance, executing a corresponding program (stored in the ROM 102 or the like) by the CPU 101 that functions as the control unit 150.

First, at S200, the control unit 150 sets an initial value of the anti-vibration setting information at each of the rotational positions of the rotation mechanisms 170 and 171 ((ON/OFF) information indicating whether or not to perform anti-vibration at each of the rotational positions). The initial value may be stored in advance in the storage unit 160, or may be set by the control unit 150. In the storage unit 160, a setting value at the end of previous anti-vibration control processing is held, and may be used as the initial value. The storage unit 160 acquires initial rotational positions of the rotation mechanisms 170 and 171 from the control unit 150, and sends the anti-vibration setting information (initial value) associated with the rotational positions to the control unit 150.

Subsequently, at S201, the image capturing unit 110 performs image capture based on setting information of the image capturing area acquired from the control unit 150, and the control unit 150 controls an operation of the rotation mechanisms 170 and 171 based on the anti-vibration setting information. Here, the setting information of the image capturing area is information set in the user terminal 300, and the control unit 150 acquires the information from the interface unit 130 via the network 200. In a case where anti-vibration is performed with the anti-vibration setting information being ON information, while the image capturing unit 110 is performing image capture, the control unit 150 controls the rotation mechanisms 170 and 171 such that an image shake disappears, based on the shake information received from the shake detection unit 140.

Figure 3:
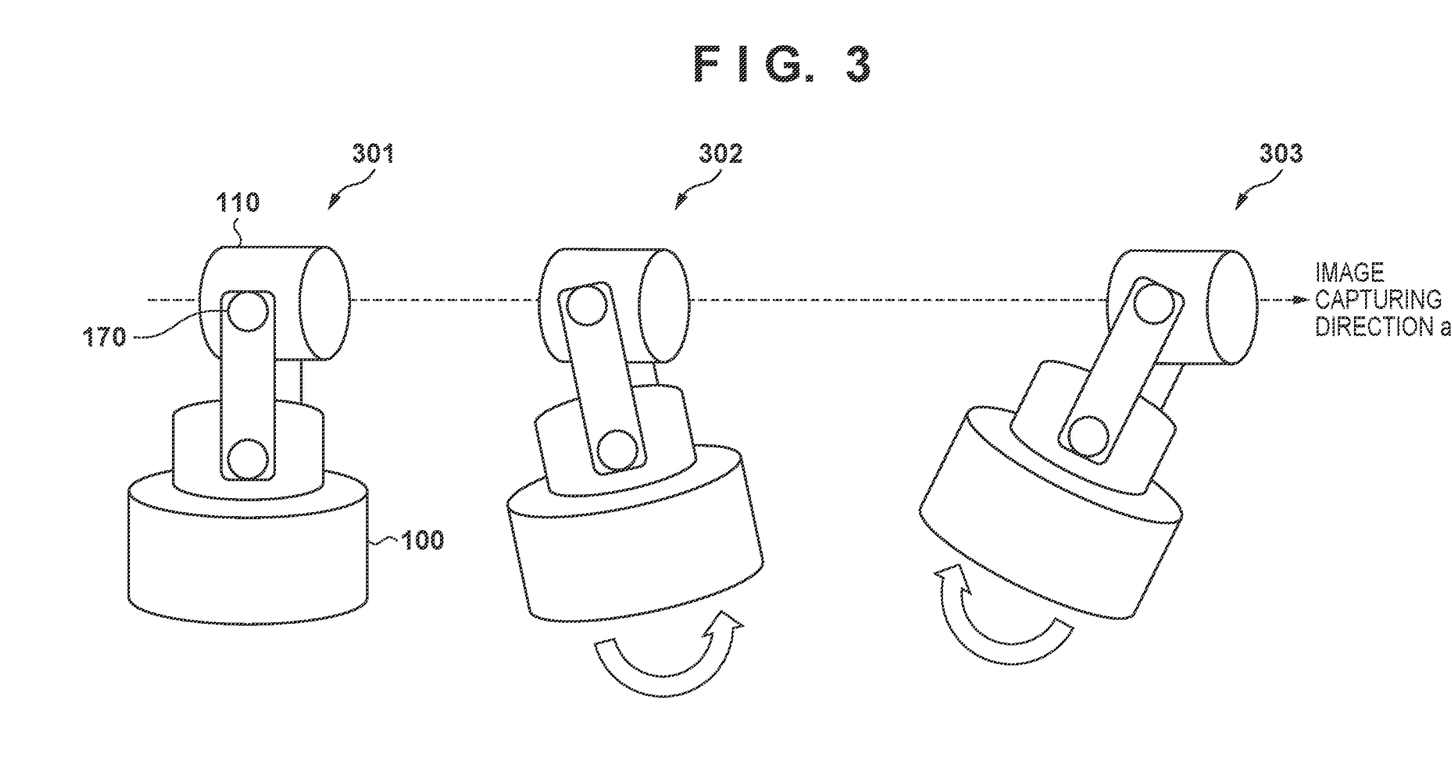
FIG. 3 is a view illustrating an operation of a rotation mechanism 170 corresponding to the first embodiment.

Here, by referring to FIG. 3, an example of an operation of controlling the rotation mechanism 170 to suppress an image shake will be described. A state 301 indicates a state where the image capturing unit 110 is held by the rotation mechanism 170 with an axis directed to the paper back direction. The state is referred to as a base state. To cancel or suppress an image shake, this can be corresponded by keeping an image capturing direction a constant. For instance, in a state where the image capturing apparatus 100 is rotated counterclockwise by receiving a shake as indicated in the state 302, the rotation mechanism 170 is controlled such that the image capturing unit 110 faces downward. In addition, in a state where the image capturing apparatus 100 is rotated clockwise as indicated in a state 303, the rotation mechanism 170 is controlled such that the image capturing unit 110 faces upward. The same applies to the rotation mechanism 171, and a rotation operation can be performed in a direction of canceling or suppressing a shake of the image capturing unit 110. In addition, in a case where the anti-vibration setting information is set to be OFF information, the image capturing unit 110 performs image capture while the control unit 150 remains fixing the rotational positions of the rotation mechanisms 170 and 171.

Subsequently, at S202, the control unit 150 determines whether or not there is a setting change by a user. Here, the setting change refers to a setting change with respect to at least one of rotational position information and the anti-vibration setting information, and the control unit 150 acquires, via the network 200, information obtained after the change and set by a user in the user terminal 300. In a case where there is the setting change, the processing proceeds to S203, and in a case where there is no setting change, the processing returns to S201 and image capture is continued without performing the setting change.

At S203, the control unit 150 determines whether or not the setting change acquired at S202 includes a change of the image capturing area. In a case where there is a change of the image capturing area, the processing proceeds to S204, and the rotational positions of the rotation mechanisms 170 and 171 are changed in the first mode. In a case where there is no change of the image capturing area, the processing transitions to S205 without changing the rotational positions.

At S204, the control unit 150 changes the rotational positions of the rotation mechanisms 170 and 171. Information of the rotational positions is generated by converting the setting information of the image capturing area received by the control unit 150 from the interface unit 130. An example of a conversion method includes a method in which the control unit 150 converts the designated setting information of the image capturing area into the rotational position information of the rotation mechanism 170 or the like, based on a conversion table. The generated rotational position information is sent from the control unit 150 to the rotation mechanisms 170 and 171, and a change of the rotational positions of the rotation mechanisms 170 and 171 to the rotational positions of the generated rotational position information is performed by driving the motor. Subsequently, the processing transitions to S205.

Subsequently, at S205, the control unit 150 determines whether or not the setting change acquired by the control unit 150 at S202 includes a change of the anti-vibration setting information. In a case where the setting change includes a change of the anti-vibration setting information, the processing transitions to S206 to update the setting value stored in the storage unit 160, and in a case where the setting change does not include a change of the anti-vibration setting information, the processing transitions to S206. At S206, the control unit 150 updates the setting value stored in the storage unit 160. As described above, in the present embodiment, the setting of whether or not to perform anti-vibration at each of the rotational positions is uniquely determined.

Subsequently, at S207, the control unit 150 updates the anti-vibration setting corresponding to the rotational positions of the rotation mechanisms 170 and 171 such that the control unit 150 operates in accordance with at least one of the rotational positions and the anti-vibration setting that are subjected to the setting change as described above. The processing from S203 to S207 described above enables the image capturing apparatus 100 to perform image capture based on the setting of the image capturing area and the anti-vibration set by the user.

Subsequently, at S208, the control unit 150 determines whether or not the image capturing apparatus 100 ends image capture. In the case of continuing image capture, the processing transitions to S201, and in the case of ending image capture and terminating an operation of the image capturing apparatus 100, the present sequence ends. In the case of ending image capture, the setting value stored in the storage unit 160 during the present sequence may be deleted or held until the next activation.

According to the present embodiment, the ON/OFF information of the anti-vibration control is stored in association with the position information of the rotation mechanisms as the anti-vibration setting, and the anti-vibration control can be performed in accordance with the position information of the rotation mechanisms.

Second Embodiment

Figure 4:
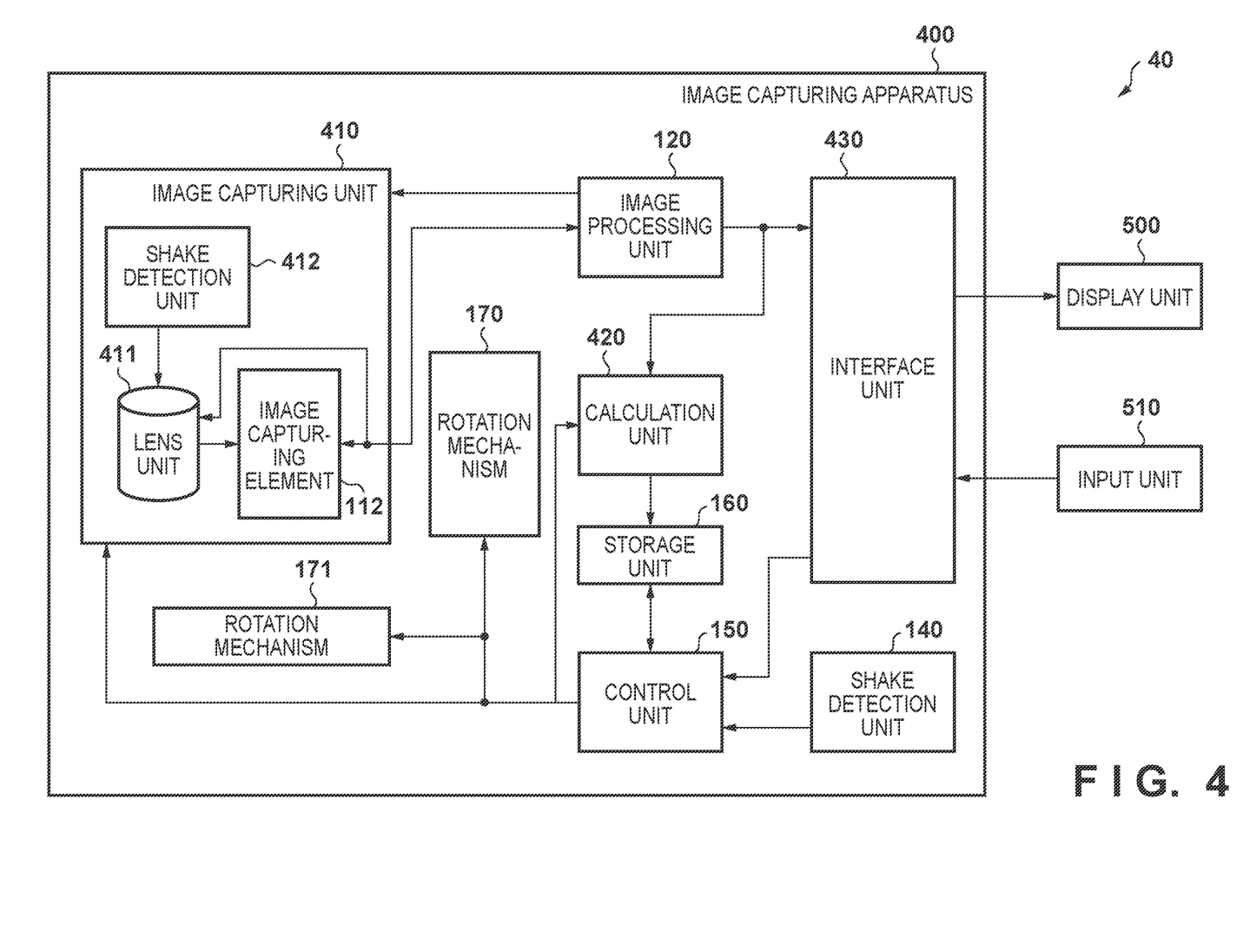
FIG. 4 is a figure illustrating an example of a system configuration corresponding to a second embodiment.

Next, a second embodiment will be described by referring to the drawings. First, a system configuration corresponding to the embodiment will be described by referring to FIG. 4. FIG. 4 is a figure illustrating a configuration example of a system corresponding to the embodiment. A system 40 corresponding to the present embodiment includes a display unit 500 and an input unit 510 connected to an image capturing apparatus 400.

In the present embodiment, to realize two different anti-vibration functions, two shake detection units having different characteristics are mounted on the image capturing apparatus 400. Accordingly, in the present embodiment, in addition to the installation environment assumed in the first embodiment, the image capturing apparatus 400 is also effective in an installation environment in which a frequency of a dominant shake is different in accordance with an image capturing area, and anti-vibration functions to be used as a countermeasure are different. The image capturing apparatus 400 realizes anti-vibration (first anti-vibration) intended for the case described in the first embodiment where a shake has a large amplitude at a low frequency, and anti-vibration (second anti-vibration) intended for the case where a shake has a small amplitude at a high frequency, and in the anti-vibration (second anti-vibration), an image shake is corrected by correction of an optical system (or by image processing).

The image capturing apparatus 400 corresponding to the present embodiment includes a configuration where with respect to the structure of the image capturing apparatus 100 described in the first embodiment, the lens unit in the image capturing unit 110 is changed to a lens unit 411 and also a shake detection unit 412 is added, and the calculation unit and the interface unit are changed to a calculation unit 420 and an interface unit 430.

The lens unit 411 includes, in addition to the mechanism of the lens unit 111 described in the first embodiment, an anti-vibration mechanism corresponding to the present embodiment. The lens unit 411 can perform anti-vibration control by acquiring high-frequency shake information from the shake detection unit 412, calculating a target position of a correction lens or the like for correcting oscillation based on the high-frequency shake information, and moving the correction lens from a current position toward the target position. Since known technology can be used for the anti-vibration mechanism and a function of the anti-vibration mechanism, further detailed description will be omitted in the present embodiment.

The shake detection unit 412 acquires shake information related to an image capturing unit 410. With regard to a configuration of the shake detection unit 412, as with the shake detection unit 140 described in the first embodiment, a gyroscope sensor or an acceleration sensor can be used. However, in the present embodiment, the shake detection unit 412 acquires the shake information for performing anti-vibration of a shake having a high frequency. Thus, in the shake detection unit 412, a sensor suitable for detecting a shake having a small amplitude at a high frequency is selected. The shake detection unit 412 provides a value indicating a direction and an amount of a shake acquired by the sensor to the lens unit 411 as the high-frequency shake information.

In the present embodiment, technology including correcting an image shake by clipping a captured image can also be used for anti-vibration with respect to a shake having a high frequency. In this case, the shake detection unit 412 sends the high-frequency shake information to an image processing unit 120 instead of the lens unit 411, and performs anti-vibration processing. When the image processing unit 120 receives the high-frequency shake information, for instance, the image processing unit 120 can correct an image shake by calculating an amount of movement of an image for canceling the shake information, and by moving an image clipped in a direction and by an amount of canceling the amount of movement. Alternatively, an image shake can be corrected by shifting a clipping position in a direction and by an amount of canceling the amount of movement, and subsequently clipping an image. Since known technology can be used for the processing, further detailed description in the present embodiment will be omitted.

In the present embodiment, although the case of switching between the first anti-vibration and the second anti-vibration in accordance with the height of a frequency of a shake is described, a frequency of a shake may be different between optical shake correction and shake correction by image processing. More specifically, a frequency of a shake intended for the optical shake correction is lower than a frequency of a shake in the shake correction by image processing. In this case, the shake detection unit 412 instructs, in accordance with a frequency of a detected shake, the lens unit 411 to perform the second anti-vibration by the optical shake correction, and in a case where a higher frequency is detected, the shake detection unit 412 instructs the image processing unit 120 to perform third anti-vibration by image processing.

The calculation unit 420 determines from an image generated by the image processing unit 120 and anti-vibration setting information set by a control unit 150 whether or not the first anti-vibration is necessary. Whether or not the first anti-vibration is necessary is determined based on whether or not an environment in which the image capturing apparatus 400 is installed and a subject are shaking as the same body. For instance, in a case where the image capturing apparatus 400 is installed in a vessel, whether or not the first anti-vibration is necessary is determined based on whether a subject is the ship (the inside of the ship), or the outside of the ship (for instance, the sea, other ships, or the like). For instance, when an image sensing target is the inside of the ship, the first anti-vibration is unnecessary, whereas in a case where an image sensing target is the outside of the ship, the first anti-vibration becomes necessary.

Figure 5A:
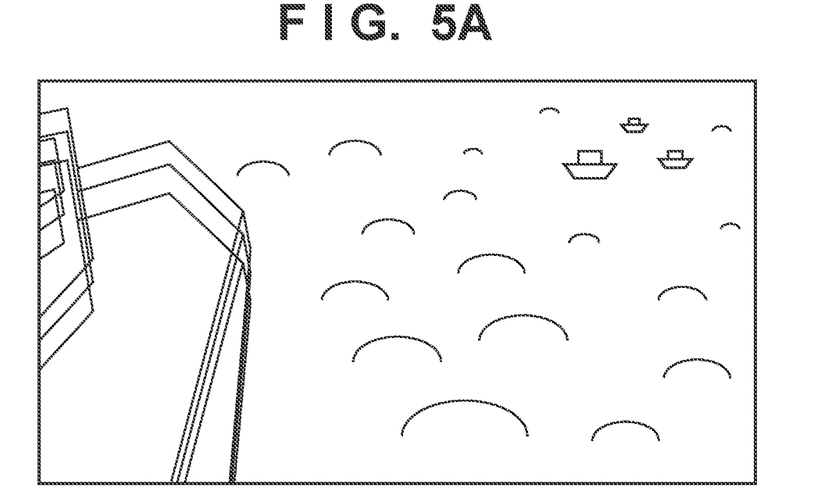
FIG. 5A is a figure illustrating an example of an image acquired when first anti-vibration is turned ON, corresponding to the second embodiment.
Figure 5B:
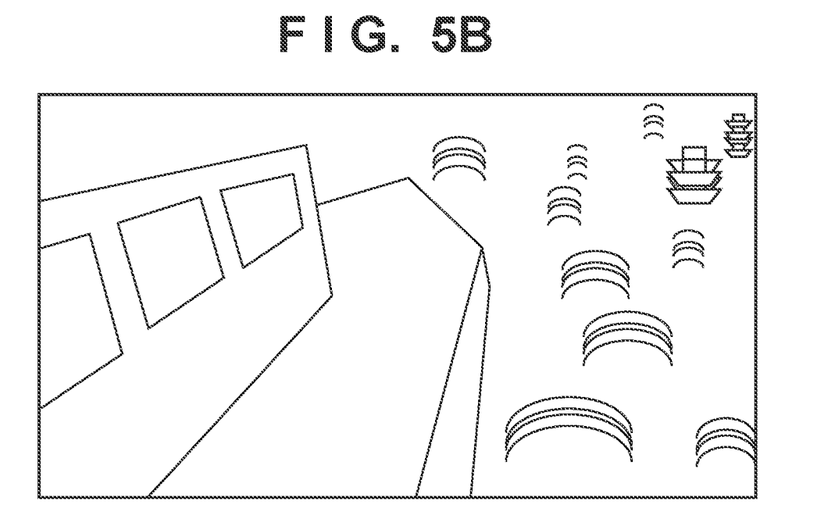
FIG. 5B is a figure illustrating an example of an image acquired when the first anti-vibration is turned OFF, corresponding to the second embodiment.

Specific determination examples will be described by referring to FIGS. 5A and 5B. FIG. 5A illustrates an example of an image acquired when the first anti-vibration is turned ON, and FIG. 5B is an image acquired when the first anti-vibration is turned OFF. In FIG. 5A, since the first anti-vibration is turned ON, the first anti-vibration acts to cancel a shake of the ship, and thus an image of a subject in the outside of the ship is captured as an image without a shake, whereas an image of a subject in the inside of the ship is recorded as an image with a shake. In FIG. 5B, the first anti-vibration is turned OFF, and since a subject shakes together with the ship, an image of the inside of the ship is captured as an image without a shake, whereas an image of the outside of the ship is captured as an image with a shake.

As described here, when the first anti-vibration is turned ON/OFF, occurrence of blurring is reversed between the inside of the ship and the outside of the ship, and thus whether an image capturing area is the inside of the ship or the outside of the ship can be determined by detecting a portion that becomes a boundary between the inside of the ship and the outside of the ship. In a case where an image of the inside of the ship is captured, the first anti-vibration is unnecessary, but the second anti-vibration is performed to perform the anti-vibration processing with respect to a shake having a high frequency. On the other hand, in a case where an image of the outside of the ship is captured, the first anti-vibration is performed. Whether the image capturing area is the inside of the ship or the outside of the ship can be replaced with rotational positions of rotation mechanisms 170 and 171 in the image capturing apparatus 400, and switching of the anti-vibration functions is performed by storing the rotational positions of the rotation mechanisms 170 and 171 in association with the anti-vibration setting information in a storage unit 160.

The interface unit 430 transmits an image to the display unit 500, and receives an input of a user from the input unit 510. A configuration of the interface unit 430 is to be a configuration compatible with interfaces of the display unit 500 and the input unit 510. Examples of the configuration include a configuration such as a HDMI and an SDI, and a configuration such as an interface compatible with a uniquely designed remote controller. The display unit 500 displays to a user an image acquired by the image capturing apparatus 400, and includes, for instance, a monitor or the like. The input unit 510 is used by a user for performing a setting of anti-vibration with respect to the image capturing apparatus 400. In FIG. 4, the display unit 500 and the input unit 510 are both in a form in which the display unit 500 and the input unit 510 are externally connected to the image capturing apparatus 400, but may be provided as a configuration of the image capturing apparatus 400. In such a case, for instance, the display unit 500 can include an LCD or the like, and the input unit 510 can include a push button or the like.

A hardware configuration of the image capturing apparatus 400 in the present embodiment is substantially similar to the hardware configuration described by referring to FIG. 1B. However, in the present embodiment, in addition to the configuration of FIG. 1B, the shake detection unit 412 is further provided, and a CPU 101 can also function as the calculation unit 420. In addition, a display device 107 can function as the display unit 500 and an input device 106 can function as the input unit 510.

Figure 6:
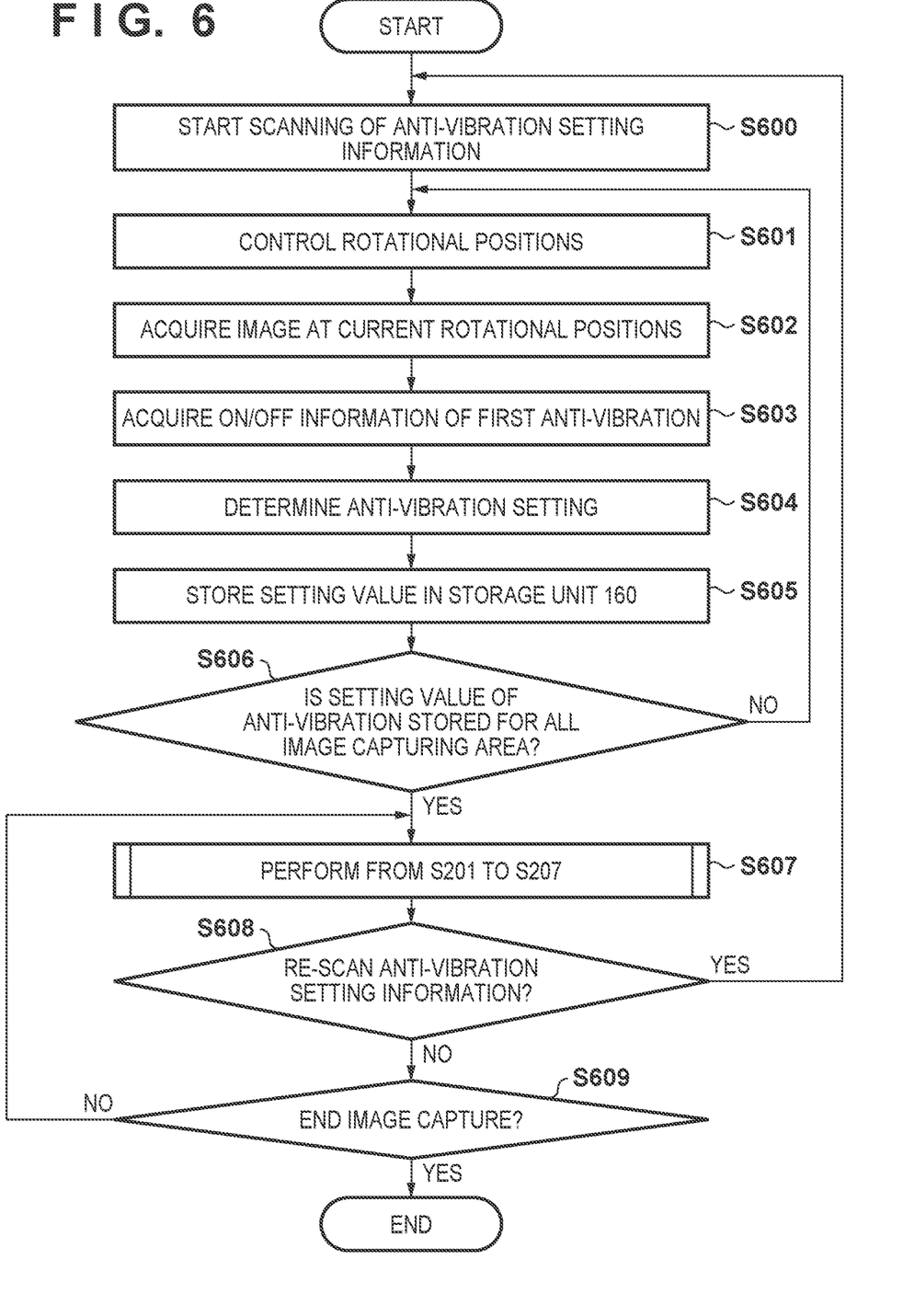
FIG. 6 is a flowchart illustrating an example of processing corresponding to the second embodiment.

Next, a flow of processing of the anti-vibration control in the present embodiment will be described by referring to FIG. 6. The anti-vibration control may be started, for instance, at the time of starting image capture by the image capturing apparatus 400. The processing corresponding to FIG. 2 can be realized by, for instance, executing a corresponding program (stored in a ROM 102 or the like) by the CPU 101 functioning as the control unit 150.

First, at S600, processing is switched to a scan mode of the anti-vibration setting information at each of rotational positions of the rotation mechanisms 170 and 171 in an environment in which the image capturing apparatus 400 is installed. The scan mode refers to processing for determining the anti-vibration setting information at each of positions in the image capturing area of the image capturing apparatus 400. In this case, in one embodiment, the display unit 500 is in a state where the display unit 500 notifies a user of the switching to the scan mode. Subsequently, S601 to S606 are repeated until the anti-vibration setting information is acquired for all the image capturing areas where image capture can be performed by a combination of all the rotational positions.

At S601, the control unit 150 controls the rotation mechanisms 170 and 171 to be at arbitrary rotational positions in all the image capturing areas. The control unit 150 sequentially sets the rotational positions to acquire an image of all the image capturing areas in the scan mode.

Subsequently, at S602, the image capturing unit 410 captures an image at current rotational positions set by the control unit 150. A captured image is subject to predetermined processing in the image processing unit 120, and sent to the calculation unit 420, and the processing transitions to S603. At S603, the control unit 150 transmits the anti-vibration setting information (ON/OFF information) of the first anti-vibration to the calculation unit 420, and the processing transitions to S604. At this time, the anti-vibration setting information of the first anti-vibration can be fixed to one of the first anti-vibration turned ON or the first anti-vibration turned OFF during a scan.

At S604, the calculation unit 420 determines whether to perform the first anti-vibration or the second anti-vibration, based on the image and the anti-vibration setting information acquired at S602 and S603, and the processing transitions to S605. It is assumed that in the determination here, in a case where image capture is performed with the first anti-vibration turned ON, the second anti-vibration is performed for a blurred region, and the first anti-vibration is performed for a non-blurred region. In addition, it is assumed that in a case where image capture is performed with the first anti-vibration turned OFF, the second anti-vibration is performed for a non-blurred region, and the first anti-vibration is performed for a blurred region. At S605, the result of selecting the first anti-vibration and the second anti-vibration determined at S604 is stored in the storage unit 160 as the anti-vibration setting information in association with the current rotational positions, and the processing transitions to S606.

Subsequently, at S606, it is determined whether or not a setting value of anti-vibration is stored for all the image capturing areas in which image capture can be performed by a combination of all the rotational positions. In a case where the anti-vibration setting value is stored for all the image capturing areas, the processing exits the scan mode and proceeds to S607, and in a case where storage of the anti-vibration setting value is not completed for all the image capturing areas, the processing returns to S601. At S601, the control unit 150 sets the rotation mechanisms 170 and 171 to the next rotational positions to continue the scan mode.

On the other hand, at S607, the processing from S201 to S207 described in the first embodiment is performed. The processing is as described above by referring to FIG. 2, and thus description of the processing will be omitted. Similarly, in the present embodiment, as with the first embodiment, it is assumed that the anti-vibration setting information stored in the storage unit 160 is overwritten by new anti-vibration setting information. In the present embodiment, in a case where the first anti-vibration is selected, the second anti-vibration is not performed, and thus at least one of detection of a shake by the shake detection unit 412, and processing related to the second anti-vibration by the lens unit 411 may be terminated. In addition, in a case where the second anti-vibration is selected, the first anti-vibration is not performed, and thus at least one of detection of a shake by the shake detection unit 140 and control processing by the control unit 150 of the rotation mechanisms 170 and 171 related to the first anti-vibration may be terminated.

At S608, it is determined whether or not a command of re-scan is sent from a user. In a case where re-scan is performed, the processing proceeds to S600 to switch to the scan mode, and in a case where re-scan is not performed, the processing transitions to S609 and it is determined whether or not to end image capture as with the first embodiment. In the case of not ending image capture at S609, the processing returns to S607 and repeats the processing from S201 to S208.

According to the above, even in an installation environment in which a frequency of a dominant shake is different in accordance with the image capturing area and the anti-vibration functions used as countermeasures are different, the anti-vibration processing can be performed effectively.

The disclosure is not limited to the above embodiments and various changes and modifications can be made within the spirit and scope of the disclosure. Therefore, to apprise the public of the scope of the disclosure, the following claims are made.

Other Embodiments

Embodiments of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-086045, filed on May 15, 2020, which is hereby incorporated by reference herein in its entirety.

What is claimed is:

1. An apparatus comprising:
a capturing element;
a rotation mechanism that adjusts an image capturing direction by rotating the capturing element;
a first detection sensor that detects a first shake of the apparatus;
a storage that stores a rotational position of the rotation mechanism in association with an anti-vibration setting; and
one or more processors executing instructions that, when executed by the one or more processors, cause the one or more processors to:
determine a rotational position of the rotation mechanism, based on a designated image capturing direction by the capturing element, and
control an operation of the rotation mechanism to cancel the detected first shake, during image capture by the capturing element at the determined rotational position, based on the anti-vibration setting stored in the storage in association with the determined rotational position.

2. The apparatus according to claim 1, wherein,
the anti-vibration setting includes a value indicating whether or not to control an operation of the rotation mechanism to cancel the first shake for each rotational position of the rotation mechanism, and
in a case where the anti-vibration setting is a setting of controlling an operation of the rotation mechanism to cancel the first shake at the determined rotational position, an operation of the rotation mechanism to cancel the first shake is controlled.

3. The apparatus according to claim 2, wherein the value is a value designated by a user for each rotational position of the rotation mechanism.

4. The apparatus according to claim 2, further comprising a second detection sensor that detects a second shake of the apparatus, the second shake having a higher frequency than a frequency of the first shake; and
an optical system,
wherein in a case where the anti-vibration setting associated with the determined rotational position is not a setting of canceling the first shake, the optical system operates to cancel the second shake.

5. The apparatus according to claim 4, wherein in a case where the anti-vibration setting is not a setting of canceling the first shake and an operation is being performed to cancel the second shake, at least one of detection of the first shake by the first detection sensor and control for canceling the first shake is terminated.

6. The apparatus according to claim 4, wherein in a case where the anti-vibration setting is a setting of canceling the first shake and control is being executed to cancel the first shake, at least one of detection of the second shake by the second detection sensor and an operation for canceling the second shake is terminated.

7. The apparatus according to claim 4, wherein the instructions further cause the one or more processors to:
determine the anti-vibration setting in accordance with a state of a shake in an image captured by the capturing element at each rotational position of the rotation mechanism,
wherein the storage stores the determined anti-vibration setting, and
an image is captured by the capturing element while an operation of the rotation mechanism to cancel the detected first shake is being controlled.

8. The apparatus according to claim 7, wherein,
in a case where a subject is shaking in the image captured at a rotational position of the rotation mechanism, an anti-vibration setting for the rotational position is not set as a setting of canceling the detected first shake, and
in a case where a subject is not shaking in the image captured at a rotational position of the rotation mechanism, an anti-vibration setting for the rotational position is set as a setting of canceling the detected first shake.

9. The apparatus according to claim 4, wherein the instructions further cause the one or more processors to:
- determine the anti-vibration setting in accordance with a state of a shake in an image captured by the capturing element at each rotational position of the rotation mechanism,
- Wherein the storage stores the determined anti-vibration setting, and
- an image is captured by the capturing element an operation of the rotation mechanism to cancel the detected first shake is not being controlled.

10. The apparatus according to claim 9, wherein,
- in a case where a subject is not shaking in the image captured at a rotational position of the rotation mechanism, an anti-vibration setting for the rotational position is not set as a setting of canceling the detected first shake, and
- in a case where a subject is shaking in the image captured at a rotational position of the rotation mechanism, an anti-vibration setting for the rotational position is set as a setting of canceling the detected first shake.

11. The apparatus according to claim 2, further comprising:
- a second detection sensor that detects a second shake of the apparatus, the second shake having a higher frequency than a frequency of the first shake,
- wherein the instructions further cause the one or more processors to:
- operate to process the image to cancel the second shake in a case where the anti-vibration setting associated with the determined rotational position is not a setting of canceling the first shake.

12. A method comprising:
- at an apparatus with a capturing element, a rotation mechanism that adjusts an image capturing direction by rotating the capturing element, a first detection sensor that detects a first shake of the apparatus, and a storage that stores a rotational position of the rotation mechanism in association with an anti-vibration setting,
- determining a rotational position of the rotation mechanism, based on a designated image capturing direction by the capturing element, and
- controlling an operation of the rotation mechanism to cancel the detected first shake, during image capture by the capturing element at the determined rotational position, based on the anti-vibration setting stored in the storage in association with the determined rotational position.

13. The method according to claim 12, wherein,
- the anti-vibration setting includes a value indicating whether or not to control an operation of the rotation mechanism to cancel the first shake for each rotational position of the rotation mechanism, and
- in a case where the anti-vibration setting is a setting of controlling an operation of the rotation mechanism to cancel the first shake at the determined rotational position, the controlling controls an operation of the rotation mechanism to cancel the first shake.

14. The method according to claim 13, wherein the value is a value designated by a user for each rotational position of the rotation mechanism.

15. The method according to claim 13, further comprising: detecting a second shake of the apparatus, the second shake having a higher frequency than a frequency of the first shake; and cancelling the second shake, in a case where the anti-vibration setting associated with the determined rotational position is not a setting of canceling the first shake.

16. A non-transitory computer-readable storage medium storing one or more program including instructions that, when executed by a processor of an apparatus comprising a capturing element, a rotation mechanism that adjusts an image capturing direction by rotating the capturing element, a first detection sensor configured to detect a first shake of the apparatus, and a storage that stores a rotational position of the rotation mechanism in association with an anti-vibration setting, causes the processor to perform operations of:
- determining a rotational position of the rotation mechanism, based on a designated image capturing direction by the capturing element, and
- controlling an operation of the rotation mechanism to cancel the detected first shake, during image capture by the capturing element at the determined rotational position, based on the stored anti-vibration setting in association with the determined rotational position.

17. The non-transitory computer-readable storage medium according to claim 16, wherein,
- the anti-vibration setting includes a value indicating whether or not to control an operation of the rotation mechanism to cancel the first shake for each rotational position of the rotation mechanism, and
- in a case where the anti-vibration setting is a setting of controlling an operation of the rotation mechanism to cancel the first shake at the determined rotational position, the controlling controls an operation of the rotation mechanism to cancel the first shake.

18. The non-transitory computer-readable storage medium according to claim 17, wherein the value is a value designated by a user for each rotational position of the rotation mechanism.

19. The non-transitory computer-readable storage medium according to claim 17, further comprising: detecting a second shake of the apparatus, the second shake having a higher frequency than a frequency of the first shake; and cancelling the second shake, in a case where the anti-vibration setting associated with the determined rotational position is not a setting of canceling the first shake.

* * * * *